US012682324B2

(12) United States Patent
Patel et al.

(10) Patent No.: US 12,682,324 B2
(45) Date of Patent: Jul. 14, 2026

(54) INTELLIGENT SERVICE REQUEST SUBMITTAL SYSTEM

(71) Applicant: THE BOEING COMPANY, Arlington, VA (US)

(72) Inventors: Jay J. Patel, Irvine, CA (US); Robert B. Santoso, Anaheim, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/331,058

(22) Filed: Jun. 7, 2023

(65) Prior Publication Data

US 2024/0412172 A1 Dec. 12, 2024

(51) Int. Cl.
*G06Q 10/20* (2023.01)
*G06F 3/04815* (2022.01)
*G06F 40/10* (2020.01)

(52) U.S. Cl.
CPC ......... *G06Q 10/20* (2013.01); *G06F 3/04815* (2013.01); *G06F 40/10* (2020.01)

(58) Field of Classification Search
CPC ...... G06Q 10/20; G06F 3/04815; G06F 40/10
USPC ....................................................... 715/848
See application file for complete search history.

(56) References Cited

U.S. PATENT DOCUMENTS

| | | | |
|---|---|---|---|
| 10,997,225 B2 | 5/2021 | Santoso et al. | |
| 2001/0032110 A1* | 10/2001 | Sinex ..................... | G06Q 40/08 |
| | | | 701/29.4 |
| 2005/0237322 A1* | 10/2005 | Minami .................. | G06T 13/20 |
| | | | 345/419 |
| 2006/0184411 A1* | 8/2006 | Gross ..................... | G06Q 10/06 |
| | | | 705/7.12 |
| 2006/0248050 A1* | 11/2006 | Brooks ................. | G06F 16/958 |
| 2011/0141109 A1* | 6/2011 | Radet .................... | G06F 3/0481 |
| | | | 715/850 |
| 2015/0134545 A1* | 5/2015 | Mann ...................... | G06F 30/13 |
| | | | 705/305 |
| 2018/0089362 A1* | 3/2018 | Delfino .................. | G06T 17/10 |
| 2019/0304212 A1* | 10/2019 | Bailey .................. | G07C 5/0825 |
| 2020/0097921 A1* | 3/2020 | Ghosh ..................... | G06N 3/08 |
| 2022/0343292 A1* | 10/2022 | Hochman ................ | B64F 5/60 |

* cited by examiner

*Primary Examiner* — Stephen S Hong
*Assistant Examiner* — Broderick C Anderson
(74) *Attorney, Agent, or Firm* — Harrity & Harrity, LLP

(57) ABSTRACT

Techniques for aircraft manufacture and product support are described. These techniques include providing a three-dimensional (3D) user interface for an aircraft and identifying a component relating to an area of concern for the aircraft, based on input to the 3D user interface. The techniques further include generating structured text for a service request relating to the area of concern based on the identified component, and submitting the service request to facilitate resolving the area of concern for the aircraft.

20 Claims, 8 Drawing Sheets

300

306

308 ⟍

504 ⟍

700

INTELLIGENT SERVICE REQUEST SUBMITTAL SYSTEM

FIELD

Aspects of the present disclosure relate to vehicle manufacture and product support, and more specifically to aircraft manufacture and product support.

BACKGROUND

Complex vehicles, such as commercial aircraft, occasionally experience equipment faults or other concerns. Service request submittal systems allow service personnel to submit service requests identifying these concerns and seeking repair or troubleshooting guidance. But existing systems are typically manual, and rely on unstructured data (e.g., narrative submissions generated by service personnel). This results in numerous errors, making identifying concerns extremely challenging, and resulting in significant delays in repairing equipment and resolving service requests.

SUMMARY

Embodiments include a method. The method includes providing a three-dimensional (3D) user interface for an aircraft. The method further includes identifying a component relating to an area of concern for the aircraft, based on input to the 3D user interface. The method further includes generating structured text for a service request relating to the area of concern based on the identified component. The method further includes submitting the service request to facilitate resolving the area of concern for the aircraft.

Embodiments further include a non-transitory computer-readable medium containing computer program code that, when executed by operation of one or more computer processors, performs operations. The operations include providing a 3D user interface for an aircraft. The operations further include identifying a component relating to an area of concern for the aircraft, based on input to the 3D user interface. The operations further include generating structured text for a service request relating to the area of concern based on the identified component. The operations further include submitting the service request to facilitate resolving the area of concern for the aircraft.

Embodiments further include a system, including a computer processor, and a memory having instructions stored thereon which, when executed on the computer processor, performs operations. The operations include providing 3D user interface for an aircraft. The operations further include identifying a component relating to an area of concern for the aircraft, based on input to the 3D user interface. The operations further include generating structured text for a service request relating to the area of concern based on the identified component. The operations further include submitting the service request to facilitate resolving the area of concern for the aircraft.

Embodiments further include generating the 3D interface for the aircraft based on correlating engineering data for the aircraft with a 3D model of the aircraft, according to any of the embodiments described above.

Embodiments further include, wherein identifying the component relating to the area of concern for the aircraft, based on input to the 3D user interface, includes: identifying the component based on determining that the component corresponds to a location of the input to the 3D user interface, according to any of the embodiments described above.

Embodiments further include, wherein identifying a component relating to an area of concern for the aircraft, based on input to the 3D user interface further includes: rendering a plurality of 3D views of the aircraft based on a plurality of user inputs to the 3D interface, generating a drawing tree relating to the plurality of 3D views, and identifying the component based on the drawing tree, according to any of the embodiments described above.

Embodiments further include, wherein generating structured text for the service request relating to the area of concern based on the identified component including: generating text describing the identified component, based on engineering data for the aircraft, according to any of the embodiments described above.

Embodiments further include, wherein generating structured text for the service request relating to the area of concern based on the identified component further includes: identifying a prior solution to the area of concern based on the generated text describing the identified component, according to any of the embodiments described above.

Embodiments further include, wherein identifying the prior solution to the area of concern based on the generated text describing the identified component includes: searching a repository of prior solutions using at least a portion of the generated text, according to any of the embodiments described above.

Embodiments further include, wherein searching the repository of prior solutions using at least the portion of the generated text is limited in scope to a subset of prior solutions in the repository, according to any of the embodiments described above.

Embodiments further include, wherein generating structured text for the service request relating to the area of concern based on the identified component includes: identifying at least one of: (i) a knowledge article or (ii) a bulletin based on the generated structured text, according to any of the embodiments described above.

Embodiments further include, at least one of: (i) repairing the aircraft based on the service request, or (ii) modifying design of a second aircraft based on the service request, according to any of the embodiments described above.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

<center>DETAILED DESCRIPTION</center>

Figure 1:
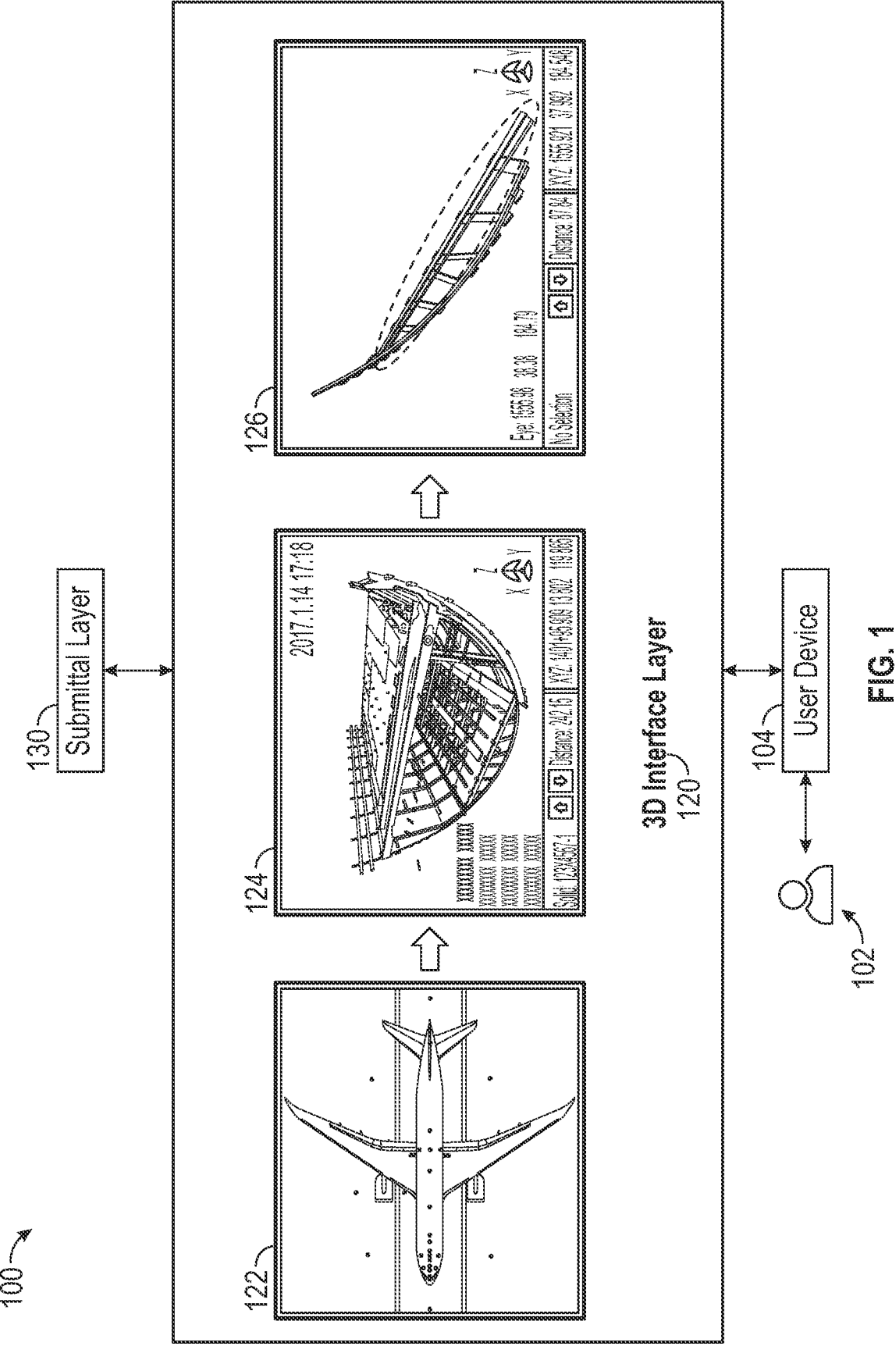
FIG. 1 depicts an intelligent service request submittal system for an aircraft, according to one aspect.

In an aspect, service requests can be improved using an automated three-dimensional (3D) interface to identify an area of concern and generate structured data describing the concern. For example, a 3D interface can render a model view of the aircraft. The 3D model can be correlated with aircraft engineering data and parameters, so that a user selecting a point or region in the 3D model corresponding to an area of concern (e.g., a damaged or malfunctioning component of the aircraft) is identified as selecting a particular component or region in the aircraft. The selected point or region can be identified using, for example, a 3D point coordinate system (e.g., x,y,z coordinates).

In an aspect, structured text can be generated to describe the identified area of concern. For example, a user selection of the area of concern in the 3D model of the aircraft can be used to generate structured text describing the concern. The structured text describing the concern can also be used to identify potential solutions to the concern, and include the solution in the structured text. For example, the description of the concern (e.g., the description of the damaged or malfunctioning component identified by the user) can be used to search prior solutions, as well as knowledge articles and bulletins, for solutions relating to the identified concern. These solutions can also be included in the structured text. The structured text can then be used to resolve the concern, can be memorialized for future use, and can be used for product development and improvement.

One or more techniques described herein provide significant technical advantages. First, a 3D interface can be correlated with aircraft engineering data and used to identify areas of concern. This is a significant improvement over existing solutions. For example, existing solutions may provide a 2D interface (or no visual interface at all), requiring a user to manually identify areas of concern. As another example, existing 3D models may not be correlated with engineering data, so that selection of a point on the model cannot be used to identify a particular area of concern in the aircraft. One or more techniques described herein improve on this by both providing a 3D interface, and correlating the 3D interface with engineering data so that selection of an area of concern in the 3D interface can be used to identify a particular component, or components, for the area of concern.

Second, generating structured text provides significant technical advantages. Existing solutions may rely on users to provide textual descriptions of areas of concern. Inconsistencies in these descriptions create significant computational and memory inefficiencies. For example, identifying potential solutions for a concern based on prior solutions can be very useful. But searching a repository of textual descriptions that do not include structured text is highly inefficient and computationally intensive, because different users use different text for descriptions. Searching a repository of structured textual descriptions, by contrast, is much faster and less computationally intensive because the text is consistent across users. Further, maintaining textual descriptions from users of areas of concern, as is done in prior solutions, requires significantly more memory than maintaining a much smaller universe of structured text describing areas of concern.

Third, one or more techniques described herein provide improvements for maintaining and manufacturing aircraft. Improved service requests allow for more efficient maintenance of aircraft, by accurately identifying areas of concern and improving search accuracy for prior solutions, knowledge articles, and bulletins. And improved service requests can be used in a feedback loop to modify aircraft design, by accurately and efficiently identifying areas of concern for the aircraft during operation.

FIG. 1 depicts an intelligent service request submittal system 100 for an aircraft, according to one aspect. In an aspect a user 102 interacts with a user device 104. The user device 104 can be any suitable computing device, including a desktop computer, a laptop computer, a smartphone, a tablet, an embedded device, or any other suitable computing device.

The user device 104 interacts with a 3D interface layer 120 to generate a service request. For example, the 3D interface layer 120 can operate on a remote computing system, including a cloud base system (e.g., a public cloud, a private cloud, a hybrid cloud, or any other suitable cloud-based system). Alternatively, some, or all, of the 3D interface layer can be implemented using a system co-located with the user device 104, or on the user device 104 itself. In an aspect, the user device 104 interacts with the 3D interface layer 120 using a suitable communication network (e.g., a local area network (LAN), wide area network (WAN), the Internet, or any other suitable communication network). Further, the user device 104 uses any suitable communication technique, including WiFi, cellular communication, wired communication, fiber optic communication, or any other suitable communication technique.

In an aspect, the 3D interface layer 120 renders a 3D interface for a user 102 to select an area of concern in an aircraft. For example, the 3D interface layer 120 can render a plan view 120 of an aircraft. The user 102 can select a portion of the aircraft, leading to the assembly view 124. The user 102 can select a portion of the assembly view 124, leading to the component view 126. This is discussed further, below, with regard to FIGS. 7A-D.

For example, the 3D interface layer 120 can correlate an interactive 3D model of the aircraft with engineering data describing various components of the aircraft. The user's selection of an area of concern in the 3D interface can generate structured text describing the area of concern. This structured text can be used to identify potential solutions to the concern, and the potential solutions can be added to the structured text. The structured text can then be included in a service request. This is discussed further, below, with regard to FIGS. 3-6.

In an aspect, the 3D interface layer 120 interacts with a submittal layer 130 to submit a service request. The service request can be resolved (e.g., by maintenance personnel or an automated system), used for modified aircraft design (e.g., as part of a feedback loop to avoid occurrence of the area of concern), or used for any other suitable purpose. This is discussed further, below, with regard to FIG. 3. In an aspect, the 3D interface layer 120 interacts with the submittal layer 130 using a suitable communication network (e.g., a LAN, WAN, the Internet, or any other suitable communication network). Further, the user device 3D interface layer 120 uses any suitable communication technique, including WiFi, cellular communication, wired communication, fiber optic communication, or any other suitable communication technique.

Figure 2:
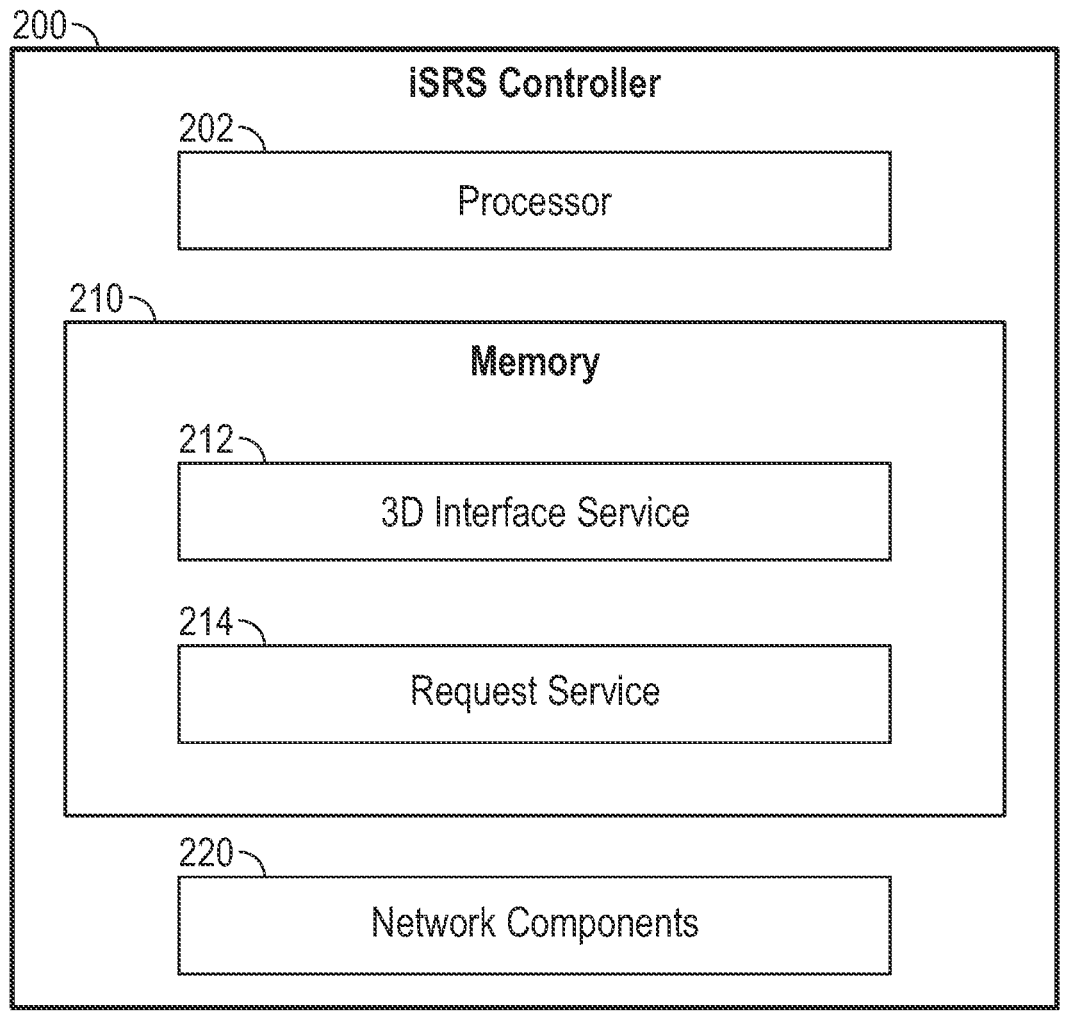
FIG. 2 depicts an intelligent service request submittal system controller, according to one aspect.

FIG. 2 depicts an intelligent service request submittal system (iSRS) controller 200, according to one aspect. In an aspect, the iSRS controller 200 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for iSRS controller 200 to interface with a suitable communication network. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the iSRS controller 200. The program code is generally described as various functional "applications" or "modules" within the memory 210, although alternate implementations may have different functions and/or combinations of functions. Within the memory 210, a 3D interface service 212 facilitates generating and using a 3D interface for service request submittal. This is illustrated further, below, with regard to FIGS. 4A-D. A request service 214 facilitates submitting a service request generated using the 3D. This is discussed further, below, with regard to FIG. 3.

Although FIG. 2 depicts the 3D interface service 212 and request service 214, as located in the memory 210, that representation is merely provided as an illustration for clarity. More generally, the iSRS controller 200 may include one or more computing platforms, such as computer servers for example, which may be co-located, or may form an interactively linked but distributed system, such as a cloud-based system (e.g., a public cloud, a private cloud, a hybrid cloud, or any other suitable cloud-based system). As a result, the processor 202 and the memory 210 may correspond to distributed processor and memory resources within a computing environment. Thus, it is to be understood that any, or all, of the 3D interface service 212 and request service 214 may be stored remotely from the iSRS controller 200 within the distributed memory resources of a computing environment.

Figure 3:
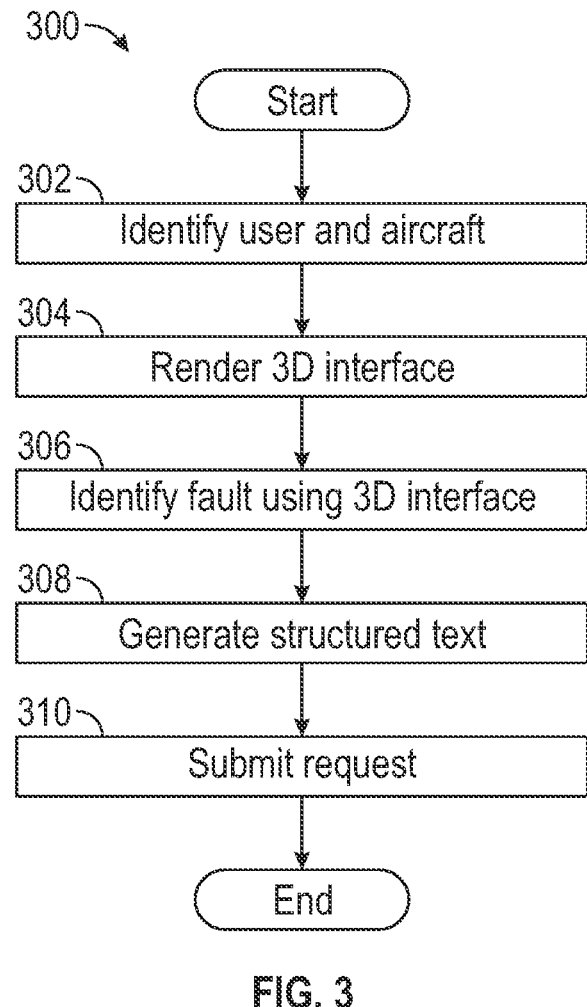
FIG. 3 depicts a flowchart for an intelligent service request submittal system for an aircraft, according to one aspect.

FIG. 3 depicts a flowchart 300 for an iSRS system for an aircraft, according to one aspect. At block 302, a request service (e.g., the request service 214 illustrated in FIG. 2) identifies the user and aircraft. For example, a user (e.g., the user 102 illustrated in FIG. 1) can log in to a suitable account on a user device (e.g., the user device 104 illustrated in FIG. 1) using login credentials (e.g., a username and password).

The user can enter an identifier for the aircraft. For example, the user can enter an aircraft variable number, one or more model numbers (e.g., a major and minor model number), or any other suitable identifier. In an aspect, the request service retrieves information about the aircraft (e.g., from a suitable electronic database or other electronic repository) using the identifier. For example, the request service can retrieve a model based definition (MBD) for the aircraft or any other suitable engineering data. The MBD can include data used to generate a 3D model for the aircraft and identify various aircraft components using the 3D model.

At block 304, a 3D interface service (e.g., the 3D interface service 212 illustrated in FIG. 2) renders a 3D interface for the aircraft. For example, the 3D interface service can use the aircraft data retrieved at block 302 (e.g., the MBD for the aircraft) to render a 3D image for the aircraft. The 3D interface service can use any suitable 3D rendering tool or technique to render the 3D image. For example, aircraft data can be gathered using light detection and ranging (LiDAR) or any other suitable technique, and the 3D model can be rendered using instance any suitable 3D rendering software or technique.

In an aspect, the 3D interface service initially renders a plan view for the aircraft (e.g., an overhead view, a profile view, a rear view, a front view, or any other suitable plan view). For example, FIG. 7A, below, depicts an example 3D plan view 700 of an aircraft. In an aspect, the 3D interface service renders the view 700 illustrated in FIG. 7A using the aircraft data.

At block 306, the user identifies a concern using the 3D interface. In an aspect, the user selects a location for the concern (e.g., using the 3D interface), and the user or a suitable software service (e.g., the 3D interface service, request service, or any other suitable service) determines a description for the concern. For example, the 3D interface service can maintain a drawing tree as the user navigates the 3D interface. The 3D interface service can use the drawing tree to correlate the 3D interface with an engineering specification for the aircraft, and can identify a component selected by the user as a particular component (or portion of a component) in the engineering specification. This is discussed further, below, with regard to FIG. 4. Further, FIGS. 7A-D, below, illustrate an example 3D interface to select the area of concern using the 3D interface. In an aspect, a three point identifier (e.g., x,y,z coordinates) are used to identify the location of the concern using the 3D interface. This is merely an example, and any suitable identifier can be used.

At block 308, the request service generates structured text. In an aspect, the request service can generate structured text describing the identified component and area of concern. For example, the request service can automatically generate text describing the identified area of concern location and describing an overall concern with the component at the location (e.g., describing a general concern with the identified component). Further, the request service can search for one or more solutions to the service request (e.g., from an existing repository of possible solutions), and can add solution text to the structured text. This is discussed further, below, with regard to FIGS. 5-6.

At block 310, the request service submits the request. For example, the request service can submit the request to a suitable service request repository for an aircraft maintenance system. The request can then be addressed through the maintenance system (e.g., using the structured text for the concern and potential solution generated at block 308). The structured text can be memorialized for future retrieval, should a similar problem occur.

In an aspect, the submitted service request can then be resolved. For example, the submitted request can be assigned to a suitable human maintenance personnel or automated system. The assignee (e.g., human or automated system) can use the structured text in the submitted service request and can resolve the concern. This can include providing instructions to the requestor on resolving the concern, ordering or providing replacement components for resolving the concern, providing repairs to the aircraft (e.g., using human personnel or an automated system), or resolving the service request in any other suitable manner.

Further, the structured text can be used to improve product development. For example, the service request information can be provided to a product development team for the relevant aircraft. The product development team can use the service request to identify potential concern, and resolve the concern during development. The service request can, effectively, serve as a part of a feedback loop for identifying and resolving concerns.

Figure 4:
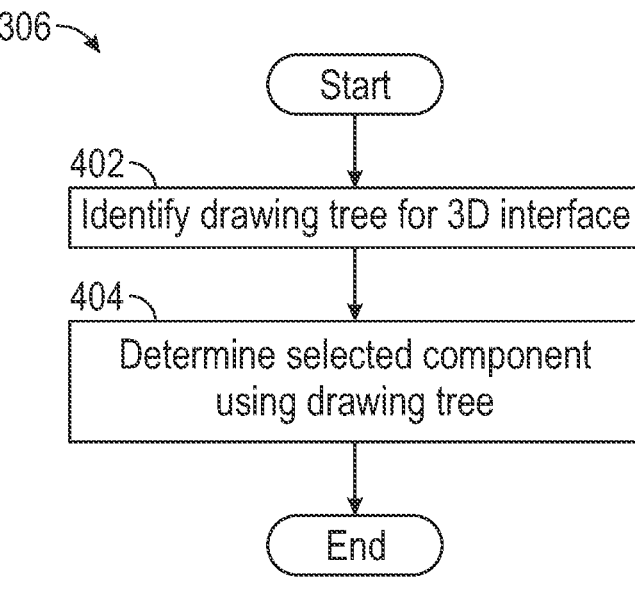
FIG. 4 depicts a flowchart for selecting an area of concern using a 3D interface, according to one aspect.

FIG. 4 depicts a flowchart for selecting an area of concern using a 3D interface, according to one aspect. In an aspect, FIG. 4 corresponds with block 306 illustrated in FIG. 3. At block 402, a 3D interface service (e.g., the 3D interface service 212 illustrated in FIG. 2) identifies a drawing tree for the 3D interface. In an aspect, the 3D interface automatically creates and updates a drawing tree, while rendering the 3D images of the interface. The drawing tree identifies the underlying component selected by the user using the 3D interface.

In an aspect, the drawing tree can be a hierarchical representation of aircraft components. For example, the drawing tree can identify components from most general to most specific. Further, the drawing tree can include specific information about each part included in the drawing tree, at each level of specificity, including materials, size, and any other suitable information.

At block 404, the 3D interface service determines the selected component using the drawing tree. For example, as discussed above, the 3D interface service can automatically create and update a drawing tree while the user navigates the 3D interface. The drawing tree can contain information describing the various aircraft components displayed using the 3D interface. When the user selects a component (e.g., clicks on a component or uses any other suitable user interface technique to select a component) the 3D interface service correlates the selection with the corresponding component in the drawing tree.

Figure 5:
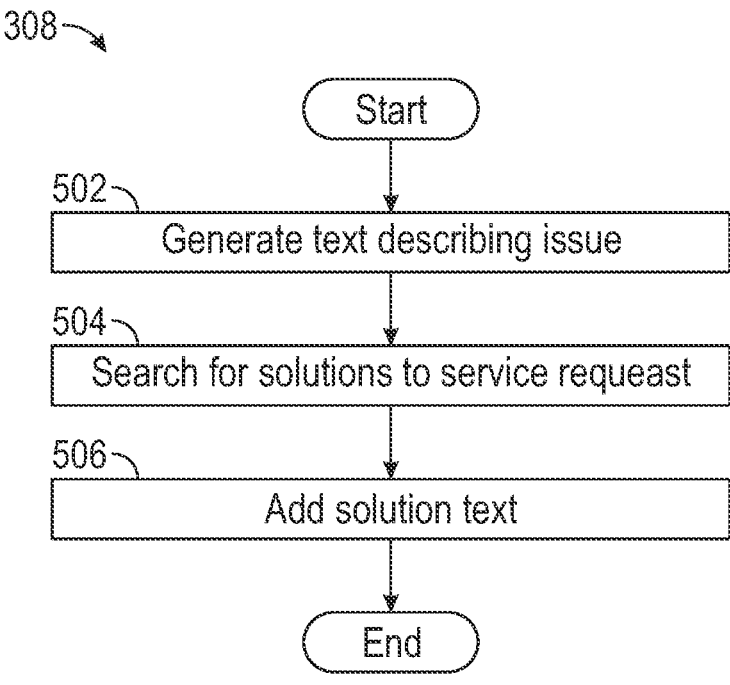
FIG. 5 depicts a flowchart for generating structured service request text, according to one aspect.

FIG. 5 depicts a flowchart for generating structured service request text, according to one aspect. In an aspect, FIG. 5 corresponds with block 308 illustrated in FIG. 3. At block 502, a request service (e.g., the request service 214 illustrated in FIG. 2) generates text describing the concern. In an aspect, the text describing the concern is generated automatically by the request service. For example, the request service can generate text that states there is a problem or fault with the identified component. Further, a suitable machine learning (ML) model can be used to generate structure text describing the concern.

Alternatively, or in addition, the user can select the concern for the identified component among a set of likely concerns. For example, the request service, a 3D interface service, or any other suitable service, can populate a user interface with potential text describing the concern. The user interface can include a selectable drop-down, checkboxes, radio buttons, or any other suitable interface to select between concern text options. The likely concern text populating the interface can be pre-defined (e.g., by a human administrator), can be generated based on previously identified concerns (e.g., using a suitable ML model or any other suitable technique), or can be generated using any other suitable technique.

At block 504, the request service searches for solutions to the service request. In an aspect, the request service can identify solutions based on prior service requests relating to the identified component (e.g., prior service requests by a given operator of the subject aircraft). Further, the request service can identify knowledge articles and bulletins relating to the identified component. This is discussed further, below, with regard to FIG. 6.

At block 506, the request service adds solution text. In an aspect, at block 504 the request service identifies previously determined solutions for concerns relating to the component, as well as knowledge articles and bulletins relating to the component. The request service can add text describing these potential solutions to the structured text for the service request.

Figure 6:
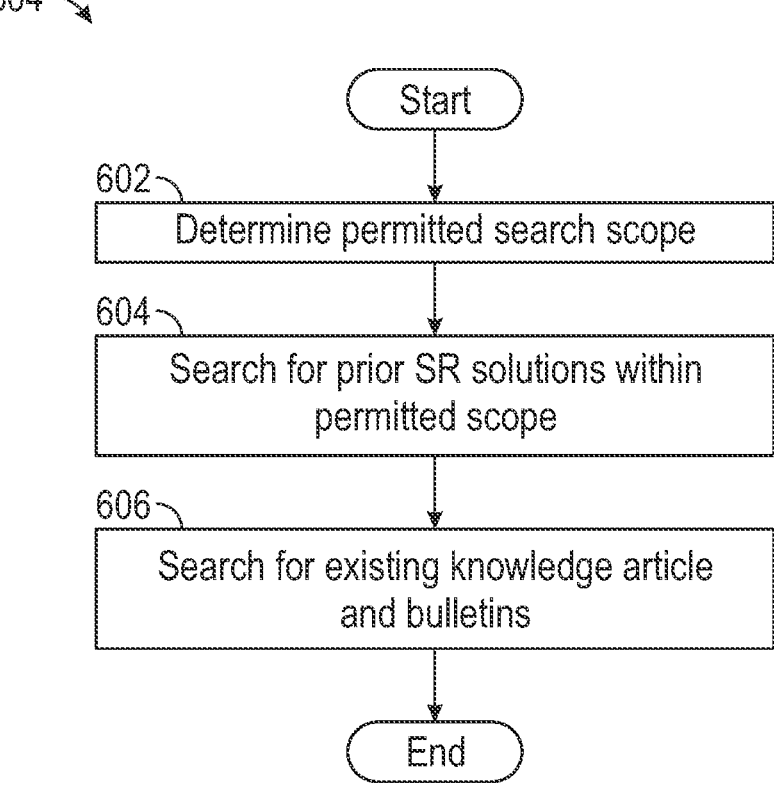
FIG. 6 depicts a flowchart for searching for service request solutions, according to one aspect.

FIG. 6 depicts a flowchart for searching for service request solutions, according to one aspect. In an aspect, FIG. 6 corresponds with block 504 illustrated at FIG. 5. At block 602, a request service (e.g., the request service 214 illustrated in FIG. 2) determines permitted search scope. In an aspect, a given aircraft operator (e.g., a commercial airline or any other suitable aircraft operator) is only permitted to access prior service requests and solutions for equipment from that aircraft operator. The aircraft operator may not be permitted to access prior service requests and solutions for competing, or unrelated, aircraft operators. At block 602 the request service determines whether the search scope should be limited. Aircraft operator is merely one possible criteria, and the search scope can be limited using any suitable criteria (e.g., time period, aircraft type, or any other suitable criteria).

At block 604, the request service searches for prior service request solutions within the permitted scope. For example, prior service request solutions can be memorialized in a suitable electronic repository (e.g., an electronic database). Structured text describing the area of concern (e.g., generated using the techniques discussed above in relation to block 308 illustrated in FIG. 3) can be correlated with prior solutions. The request service can search for prior solutions using the structured text describing the area of concern. If the scope is limited, the request service searches a subset of available service requests and solutions available in the relevant repository. As discussed above, this is a significant advantage to use of structured text for service requests. Searching for prior solutions for a particular component is much more efficient, and accurate, when predictable structured text is used for service requests relating to the component.

At block 606, the request service searches for existing knowledge articles and bulletins. In an aspect, an aircraft manufacturer, operator, or both, may maintain knowledge articles and bulletins describing known concerns relating to a particular component. These can include a structural repair manual (SRM), a service bulletin (SB), a fleet team digest (FTD), and any other suitable knowledge article or bullet. The request service can identify these existing knowledge articles and bullets. For example, the knowledge articles and bulletins can be correlated with structured text describing the relevant component, and the request service can use corresponding structured text to search for the knowledge articles and bulletins.

In an aspect, the request service connects to one or more external systems to identify prior solutions, knowledge articles and bulletins, or any other suitable information. For example, the request service can contact an external system through a suitable application programming interface (API), and can retrieve desired data (e.g., prior solutions, knowledge articles, bulletins, and any other suitable data) using the API.

Figure 7A:
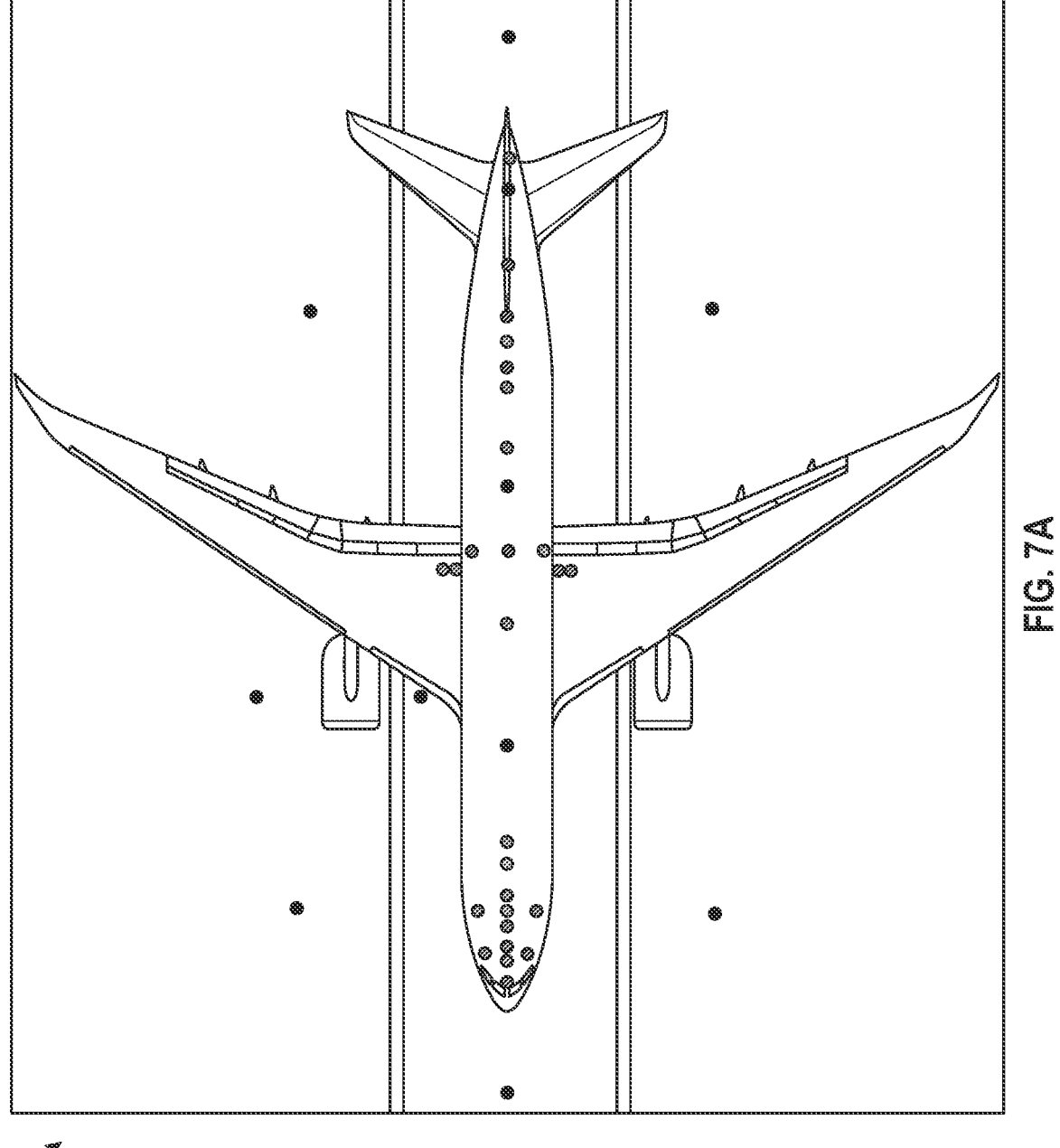
FIGS. 7A-D depict a three-dimensional aircraft user interface for an intelligent service request submittal system, according to one aspect.

FIGS. 7A-D depict a three-dimensional aircraft user interface for an intelligent service request submittal system, according to one aspect. FIG. 7A illustrates an example 3D aircraft plan view 700. As discussed above in relation to block 304 illustrated in FIG. 3, in an aspect a 3D interface service (e.g., the 3D interface service 212 illustrated in FIG. 2) renders the 3D aircraft plan view 700 based on user input or selection of an aircraft model. The user can then select a portion of the aircraft (e.g., a point or region) where a fault has occurred.

Figure 7B:
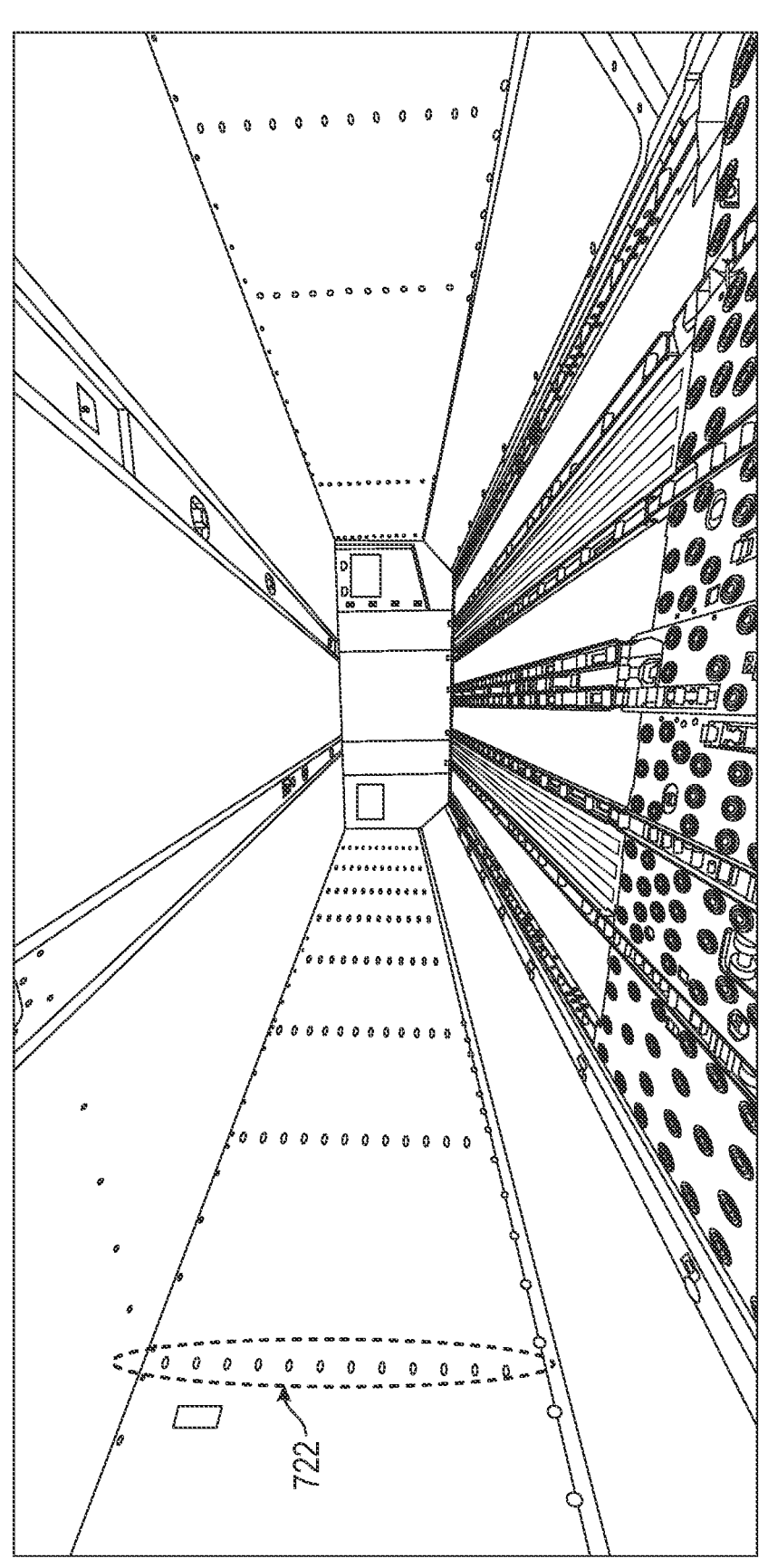

FIG. 7B illustrates an interior view 720 of an aircraft. In an aspect, a user clicks on a portion of the aircraft plan view 700 illustrated in FIG. 7A. The 3D rendering service then renders the corresponding interior view 720 of the aircraft (e.g., the aircraft illustrated in FIG. 7A). In an aspect, the user selects a section 722 on the interior view as the area of concern. For example, user can select a cargo compartment of the aircraft in the 3D aircraft plan view 700. The 3D rendering service can then render the interior of the cargo compartment as the interior view 720. The user can select the region 722 in the cargo compartment, and the 3D rendering service can render a view of the component(s) in the selected region.

Figure 7C:
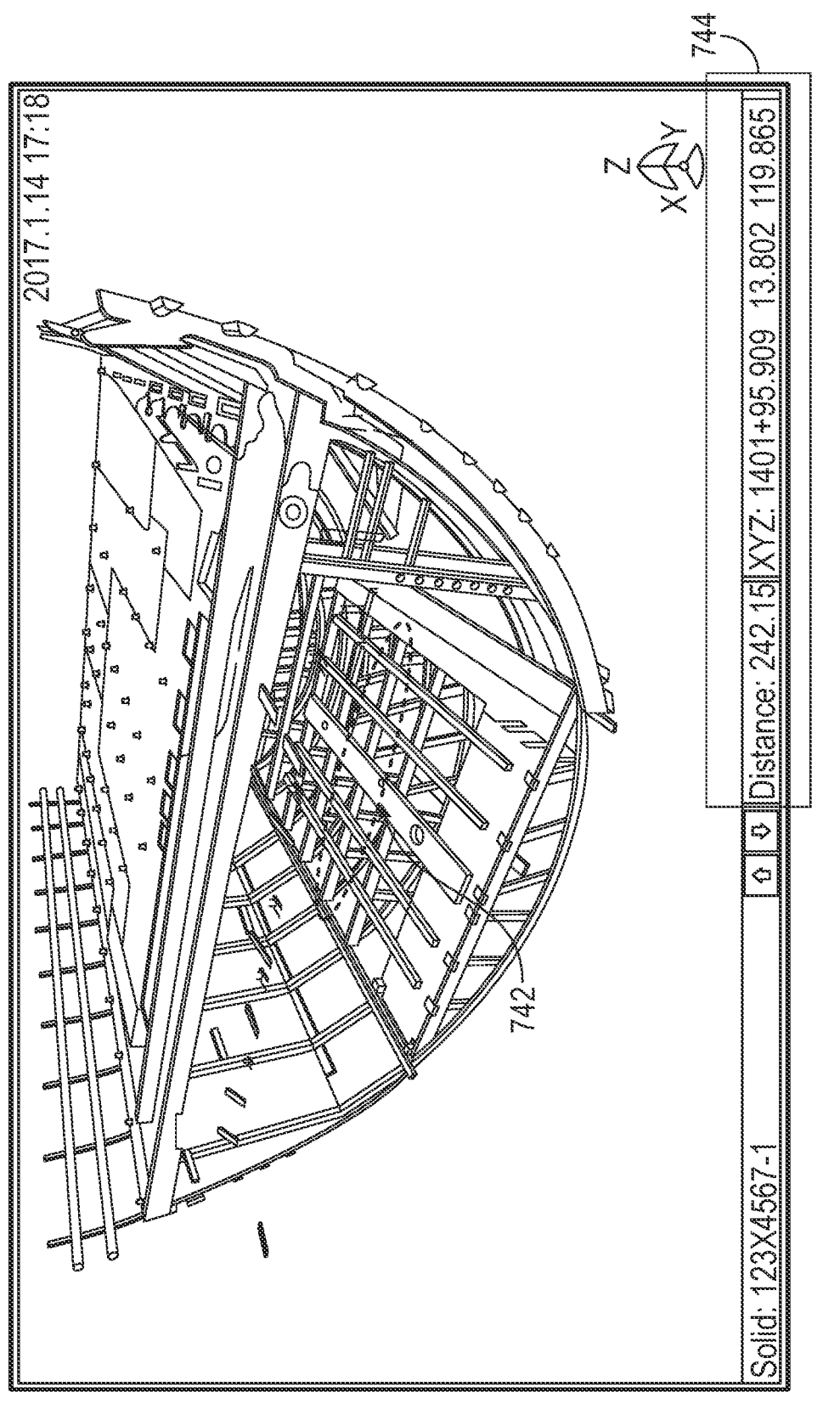

FIG. 7C illustrates an assembly view 740 of an aircraft region. In an aspect, a user selects a region 722 illustrated in FIG. 7B. The 3D rendering service renders an assembly view 740 of the selected region. For example, the assembly view 740 illustrates an example cargo floor frame assembly. In an aspect, the user selects a component 742. For example, the component 742 is a frame assembly beam. The 3D rendering service then renders a view of the selected component.

Further, in an aspect the 3D rendering service can provide one more attributes 744 of the assembly view to the user. In an aspect, the 3D rendering service can provide coordinates (e.g., x,y,z coordinates), a distance value, or both. For example, x,y,z coordinates can represent the exact location of the item in question in a model based definition for the aircraft. In an aspect, each aircraft model includes a coordinate system that represents a physical point in an actual built aircraft. The x,y,z coordinates can represent this physical point. These are merely example, and the 3D rendering service can provide any suitable coordinates or other attributes.

Figure 7D:
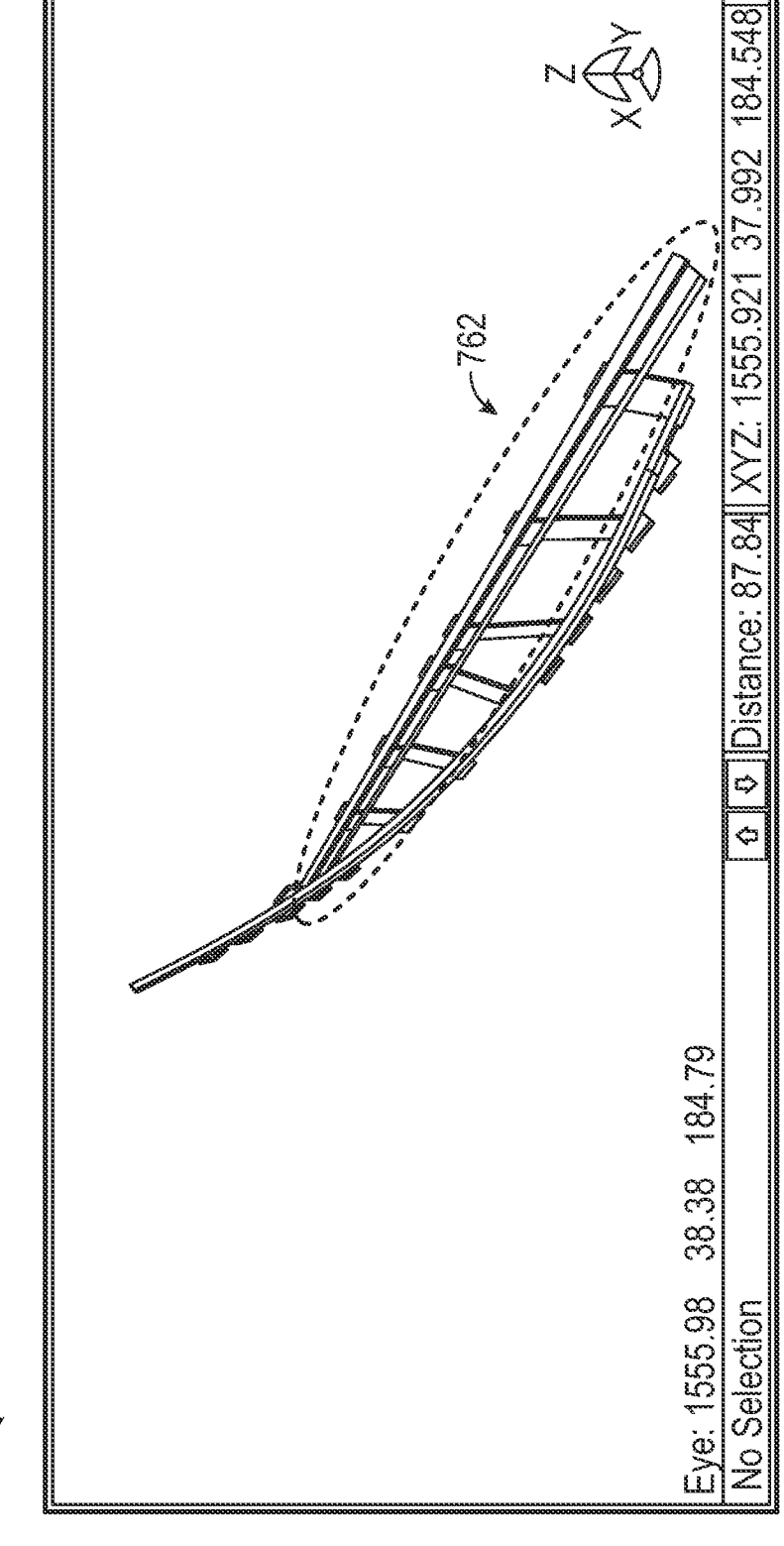

FIG. 7D illustrates a component view 760 of an aircraft component. In an aspect, a user selects a component in the assembly view 740 illustrated in FIG. 7C. The 3D rendering service renders the selected component. For example, FIG. 7C illustrates a frame assembly beam. The user then marks the region of the component with a concern (e.g., damage or a malfunction). The region 762 identifies the damaged region. As discussed above in relation to block 308 illustrated in FIG. 4, a request service (e.g., the request service 214 illustrated in FIG. 2) then generates structured text describing the selected component region.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
providing a three-dimensional (3D) user interface for an aircraft;
identifying a component relating to an area of concern for the aircraft, based on input to the 3D user interface, comprising:
rendering a plurality of 3D views of the aircraft based on a plurality of user inputs to the 3D user interface;
generating a drawing tree relating to the plurality of 3D views, wherein the drawing tree comprises a hierarchical representation of aircraft components; and
identifying the component based on the drawing tree, the identifying comprising:
identifying a first user input of the plurality of user inputs to the 3D user interface;
correlating the first user input to the 3D user interface with the drawing tree; and
identifying the component based on determining that the component corresponds to a location of the area of concern using the 3D user interface, wherein the identified component is a component of the aircraft that has a malfunction;
generating structured text for a service request which includes a description of the area of concern for the malfunction,
wherein the structured text describes the identified component;
determining a solution to the area of concern by searching a repository, using at least a portion of the structured text, wherein content from the repository is correlated with the structured text describing the identifier component to determine the solution;
adding the solution to the structured text for the service request; and
submitting the service request to facilitate resolving the identified component for the aircraft,
wherein the drawing tree comprises information about each of the aircraft components, and
wherein the information about each of the aircraft components comprises materials used for a respective component.

2. The method of claim 1, comprising: generating the 3D user interface for the aircraft based on correlating engineering data for the aircraft with a 3D model of the aircraft.

3. The method of claim 2, wherein identifying the component relating to the area of concern for the aircraft, based on input to the 3D user interface, comprises:
identifying the component based on determining that the component corresponds to the location of the area of concern using the 3D user interface.

4. The method of claim 1, wherein generating structured text for the service request comprises:
generating text describing the identified component, based on engineering data for the aircraft.

5. The method of claim 1, wherein determining a solution comprises:
identifying a prior solution to the area of concern based on the structured text describing the identified component.

6. The method of claim 1, wherein searching the repository for prior solutions using at least the portion of the structured text is limited in scope to a subset of prior solutions in the repository.

7. The method of claim 1, wherein the repository includes at least one of: (i) a knowledge article or (ii) a bulletin based on the generated structured text.

8. The method of claim 1, further comprising: at least one of: (i) repairing the aircraft based on the service request, or (ii) modifying design of a second aircraft based on the service request.

9. The method of claim 1, wherein generating structured text for a service request comprises:
generating structured text using a machine learning model.

10. The method of claim 1, wherein the area of concern is identified based on a 3D coordinate system.

11. A non-transitory computer-readable medium containing computer program code that, when executed by operation of one or more computer processors, performs operations comprising:
providing a three-dimensional (3D) user interface for an aircraft;
identifying a component relating to an area of concern for the aircraft, based on input to the 3D user interface, comprising:
rendering a plurality of 3D views of the aircraft based on a plurality of user inputs to the 3D user interface;
generating a drawing tree relating to the plurality of 3D views, wherein the drawing tree comprises a hierarchical representation of aircraft components;
identifying the component based on the drawing tree, the identifying comprising:
identifying a first user input of the plurality of user inputs to the 3D user interface;
correlating the first user input to the 3D user interface with the drawing tree; and identifying the component based on determining that the component corresponds to a location of the area of concern using the 3D user interface, wherein the identified component is a component of the aircraft that has a malfunction;

generating, using a machine learning model, structured text for a service request which includes a description of the area of concern for the malfunction, wherein the structured text describes the identified component;

determining a solution to the area of concern by searching a repository using at least a portion of the structured text, wherein content of the repository includes at least one of: (i) a knowledge article or (ii) a bulletin, and wherein the content from the repository is correlated with the structured text describing the identifier component to determine the solution;

adding the solution to the structured text for the service request; and submitting the service request to facilitate resolving the identified component of the aircraft.

12. The non-transitory computer-readable medium of claim 11, the operations further comprising: generating the 3D user interface for the aircraft based on correlating engineering data for the aircraft with a 3D model of the aircraft; and wherein identifying the component relating to the area of concern for the aircraft, based on input to the 3D user interface, comprises:

identifying the component based on determining that the component corresponds to a location of the input to the 3D user interface.

13. The non-transitory computer-readable medium of claim 11, wherein generating structured text for the service request comprises:

generating text describing the identified component, based on engineering data for the aircraft.

14. The non-transitory computer-readable medium of claim 13, wherein determining a solution comprises:

identifying a prior solution to the area of concern based on the structured text describing the identified component.

15. The non-transitory computer-readable medium of claim 11, wherein the knowledge article or the bulletin includes one or more of:

a structural repair manual (SRM), a service bulletin (SB), or a fleet team digest (FTD).

16. A system, comprising:

a computer processor; and a memory having instructions stored thereon which, when executed on the computer processor, performs operations comprising:

providing a three-dimensional (3D) user interface for an aircraft;

identifying a component relating to an area of concern for the aircraft, based on input to the 3D user interface, comprising:

rendering a plurality of 3D views of the aircraft based on a plurality of user inputs to the 3D user interface;

generating a drawing tree relating to the plurality of 3D views, wherein the drawing tree comprises a hierarchical representation of aircraft components;

identifying the component based on the drawing tree, the identifying comprising:

identifying a first user input of the plurality of user inputs to the 3D user interface;

correlating the first user input to the 3D user interface with the drawing tree; and identifying the component based on determining that the component corresponds to a location of the area of concern using the 3D user interface, wherein the identified component is a component of the aircraft that has a malfunction;

generating, using a machine learning model, structured text for a service request which includes a description of the area of concern for the malfunction, wherein the structured text describes the identified component;

determining a solution to the area of concern by searching a repository, using at least a portion of the structured text, wherein content from the repository is correlated with the structured text describing the identifier component to determine the solution;

adding the solution to the structured text for the service request; and submitting the service request to facilitate resolving the identified component of the aircraft, wherein the drawing tree comprises information about each of the aircraft components, and wherein the information about each of the aircraft components comprises materials used for a respective component.

17. The system of claim 16, the operations further comprising: generating the 3D user interface for the aircraft based on correlating engineering data for the aircraft with a 3D model of the aircraft; and wherein identifying the component relating to the area of concern for the aircraft, based on input to the 3D user interface, comprises:

identifying the component based on determining that the component corresponds to a location of the input to the 3D user interface.

18. The system of claim 16, wherein generating structured text for the service request comprises:

generating text describing the identified component, based on engineering data for the aircraft.

19. The system of claim 18, wherein generating structured text for the service request comprises:

identifying a prior solution to the area of concern based on the structured text describing the identified component.

20. The system of claim 16, wherein the area of concern is identified based on a 3D coordinate system.

* * * * *